(12) United States Patent
Lunt

(10) Patent No.: US 8,800,005 B2
(45) Date of Patent: Aug. 5, 2014

(54) AUTHORIZATION AND AUTHENTICATION BASED ON AN INDIVIDUAL'S SOCIAL NETWORK

(75) Inventor: Christopher Lunt, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/565,523

(22) Filed: Aug. 2, 2012

(65) Prior Publication Data

US 2013/0198169 A1    Aug. 1, 2013

Related U.S. Application Data

(63) Continuation of application No. 10/897,766, filed on Jul. 22, 2004, now Pat. No. 8,302,164.

(51) Int. Cl.
*G06F 17/00*      (2006.01)

(52) U.S. Cl.
USPC .............................................................. 726/4

(58) Field of Classification Search
USPC .............................................................. 726/4
See application file for complete search history.

(56) References Cited

U.S. PATENT DOCUMENTS

| | | | |
|---|---|---|---|
| 5,950,200 A | 9/1999 | Sudai | |
| 5,963,951 A | 10/1999 | Collins | |
| 5,978,768 A | 11/1999 | McGovern | |
| 6,052,122 A | 4/2000 | Sutcliffe | |
| 6,061,681 A | 5/2000 | Collins | |
| 6,073,105 A | 6/2000 | Sutcliffe | |
| 6,073,138 A | 6/2000 | de l'Etraz | |
| 6,175,831 B1 | 1/2001 | Weinreich | |
| 6,249,282 B1 | 6/2001 | Sutcliffe | |
| 6,269,369 B1 | 7/2001 | Robertson | |
| 6,324,541 B1 | 11/2001 | de l'Etraz | |
| 6,363,427 B1 | 3/2002 | Teibel | |
| 6,366,962 B1 | 4/2002 | Teibel | |
| 6,370,510 B1 | 4/2002 | McGovern | |
| 6,408,309 B1 | 6/2002 | Agarwal | |
| 6,542,748 B2 | 4/2003 | Hendrey | |
| 6,735,568 B1 | 5/2004 | Buckwalter | |
| 7,069,308 B2 | 6/2006 | Abrams | |
| 7,478,078 B2 | 1/2009 | Lunt | |
| 7,546,338 B2 | 6/2009 | Schran | |

(Continued)

FOREIGN PATENT DOCUMENTS

| | | |
|---|---|---|
| EP | 1 085 707 | 3/2001 |
| EP | 1 782 604 | 5/2011 |
| WO | WO 03/030051 | 4/2003 |
| WO | WO 2006/019752 | 2/2006 |

OTHER PUBLICATIONS

European Search Report for EP 10182314.4, Nov. 17, 2010.

(Continued)

*Primary Examiner* — Matthew Smithers
(74) *Attorney, Agent, or Firm* — Baker Botts L.L.P.

(57) ABSTRACT

In particular embodiments, a method includes accessing a graph structure comprising a plurality of nodes and edges where each node represents a user, receiving a search query from a first user, identifying content of one or more second users corresponding to the search query, and generating search results comprising all the identified content of second users that are connected to the first user in the graph structure through a series of edges and nodes that does not comprise an unauthorized node.

20 Claims, 8 Drawing Sheets

(56) References Cited

U.S. PATENT DOCUMENTS

| | | | |
|---|---|---|---|
| 7,613,776 | B1 | 11/2009 | Ben-Yoseph |
| 7,653,693 | B2 | 1/2010 | Heikes |
| 8,010,458 | B2 | 8/2011 | Galbreath |
| 8,291,477 | B2 | 10/2012 | Lunt |
| 8,302,164 | B2 | 10/2012 | Lunt |
| 2002/0086676 | A1 | 7/2002 | Hendrey |
| 2002/0087466 | A1 | 7/2002 | Fais |
| 2002/0124053 | A1 | 9/2002 | Adams |
| 2002/0196159 | A1 | 12/2002 | Lesenne |
| 2003/0050970 | A1 | 3/2003 | Akiyama |
| 2003/0078972 | A1 | 4/2003 | Tapissier |
| 2003/0097597 | A1 | 5/2003 | Lewis |
| 2003/0154194 | A1 | 8/2003 | Jonas |
| 2003/0167308 | A1 | 9/2003 | Schran |
| 2004/0003071 | A1 | 1/2004 | Mathew |
| 2004/0034601 | A1 | 2/2004 | Kreuzer |
| 2004/0064734 | A1 | 4/2004 | Ehrlich |
| 2004/0088325 | A1 | 5/2004 | Elder |
| 2004/0122803 | A1 | 6/2004 | Dom |
| 2004/0122855 | A1 | 6/2004 | Ruvolo |
| 2004/0144301 | A1 | 7/2004 | Neudeck |
| 2004/0148275 | A1 | 7/2004 | Achlioptas |
| 2004/0205126 | A1 | 10/2004 | Ben-Yoseph |
| 2004/0210639 | A1 | 10/2004 | Ben-Yoseph |
| 2004/0215648 | A1 | 10/2004 | Marshall |
| 2004/0215793 | A1 | 10/2004 | Ryan |
| 2004/0236836 | A1* | 11/2004 | Appelman et al. ............ 709/206 |
| 2004/0255032 | A1 | 12/2004 | Danieli |
| 2005/0026696 | A1 | 2/2005 | Hashimoto |
| 2005/0055416 | A1 | 3/2005 | Heikes |
| 2005/0076241 | A1* | 4/2005 | Appelman ................... 713/201 |
| 2005/0097170 | A1 | 5/2005 | Zhu |
| 2005/0097319 | A1 | 5/2005 | Zhu |
| 2005/0144279 | A1 | 6/2005 | Wexelblat |
| 2005/0149606 | A1 | 7/2005 | Lyle |
| 2005/0177385 | A1* | 8/2005 | Hull et al. ......................... 705/1 |
| 2005/0197846 | A1 | 9/2005 | Pezaris |
| 2005/0198031 | A1* | 9/2005 | Pezaris et al. .................... 707/9 |
| 2005/0209999 | A1 | 9/2005 | Jou |
| 2005/0216300 | A1 | 9/2005 | Appelman |
| 2005/0246420 | A1 | 11/2005 | Little, II |
| 2005/0256866 | A1 | 11/2005 | Lu |
| 2005/0267940 | A1 | 12/2005 | Galbreath |
| 2005/0273378 | A1 | 12/2005 | MacDonald-Korth |
| 2006/0031313 | A1 | 2/2006 | Libbey, IV |
| 2007/0214001 | A1 | 9/2007 | Patron |
| 2008/0082541 | A1 | 4/2008 | Davidson |
| 2009/0016499 | A1 | 1/2009 | Hullfish |
| 2009/0112827 | A1 | 4/2009 | Achlioptas |
| 2010/0180032 | A1 | 7/2010 | Lunt |
| 2012/0311680 | A1 | 12/2012 | Lunt |

OTHER PUBLICATIONS

Notice of Opposition to European Patent EP 1782604, Feb. 16, 2012.

Mike Martin, "Can Social Networking Stop Spam?" *Sci-Tech Today*, http://www.sci-tech-today.com/story.xhtml?story_id=23355, Mar. 2004.

J. Rosenberg et al., "The Session Initiation Protocol (SIP) and Spam." *Internet Engineering Task Force*, Jul. 2004: pp. 1-19. *Soft Armor Systems*, Nov. 10, 2005, http://www.softarmor.com/wgdb/docs/draft-rosenberg-sipping-spam-00.txt.

U.S. Appl. No. 13/565,475, filed May 25, 2011, Lunt.

U.S. Appl. No. 13/565,550, filed Aug 25, 2011, Lunt.

PCT Invitation to Pay Additional Fees and Communication Relating to the Results of the Partial International Search for PCT/US2005/024741, Oct. 25, 2005.

Office Action for Patent Application EP 05 771 078.2, Mar. 31, 2010.

3rd Generation Partnership Project; Technical Specification Group Services and System Aspects; International Mobile station Equipment Identities (IMEI)(Release 5) 3GPP TS 22.016 V5.0.0, Jun. 2002.

Breslin et al., "The Future of Social Networks on the Internet—The Need for Semantics," IEEE, pp. 86-90, 2007.

Boykin et al., "Leveraging Social Networks to Fight Spam," IEEE, pp. 61-69, 2005.

Zhou et al., "Preserving Privacy in Social Networks Against Neighborhood Attacks," IEEE, pp. 506-516, 2008.

European Summons to Attend Oral Proceedings and Summons for Application for EP 05771078.2, Nov. 18, 2013.

* cited by examiner

FIG. 4

| B's Black List |
|---|
| D |
| L |

FIG. 5

| B's Gray List |
|---|
| C |
| I |
| J |
| F |
| M |

FIG. 8

| B's White List |
|---|
| ME |
| A |
| C |
| F |
| G |
| H |

AUTHORIZATION AND AUTHENTICATION BASED ON AN INDIVIDUAL'S SOCIAL NETWORK

CROSS-REFERENCE TO RELATED APPLICATIONS

This application is a continuation under 35 U.S.C. §120 of U.S. patent application No. 10/897,766, filed Jul. 22, 2004.

BACKGROUND OF THE INVENTION

1. Field of the Invention

The present invention generally relates to authorizing activities and authenticating individuals, and more specifically, to methods for authorizing information flow to an individual and authenticating an individual for access to information or service based on that individual's social network.

2. Description of the Related Art

One of the major benefits of the Internet has been the ease of communicating information to a large number of people. Some users have, however, been abusing this benefit by sending unwanted e-mail solicitations, known as SPAM, to individuals over the Internet. The problem with SPAM has become so pervasive that some states have passed legislation prohibiting SPAM.

Further, the open nature of the Internet has caused providers of content and service over the Internet to place controls on who may access its content or service. The controls are sometimes unnecessarily restrictive and the processes used to grant access tend to be overly cumbersome, to the detriment of both users who might have benefited from the content or service and providers who might have benefited from revenues generated from these users.

SUMMARY OF THE INVENTION

The invention provides a method of authorizing transmission of content to an individual as a way to filter out unwanted communication such as SPAM or content that the individual might find to be offensive, and a method of authenticating individuals for access to content or service that makes the content or service available to more users while limiting access to potentially abusive users of the content or service. In particular, a service provider examines an individual's social network and a black list of persons that have been determined to be untrustworthy to determine whether to authorize transmission of content to that individual or authenticate that individual for access to information or service.

In a first embodiment of the invention, the authorization is performed in connection with an e-mail communication service. When an e-mail communication with an individual is attempted, that individual's social network is searched for a path between the sender and the individual. If the path exists and the path does not traverse through unauthorized nodes, the e-mail communication is authorized. If there is no such path, the e-mail communication is prohibited.

In a second embodiment of the invention, the authorization is performed in connection with a search. When an individual enters a search query, the search engine retrieves relevant search results for delivery to the individual. The search results that are delivered to the individual do not include content posted by those persons who are not connected to the individual in the individual's social network through authorized nodes.

In a third embodiment of the invention, the service provider is a third party content provider. When an individual requests access to the content provided by this entity, the entity examines its user base to determine if any of its users is related to this individual. If there is a relationship and the individual and the related user are connected through authorized nodes, the individual is given access. If not, access is denied to the individual.

In a fourth embodiment of the invention, the service provider is a lender. When an individual applies for a loan, the lender examines the credit ratings of members of the individual's social network who are connected to the individual through authorized nodes. If the average credit rating of these members is at least a minimum credit score, the lender continues to process the loan application. Otherwise, the loan application is rejected.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a sample black list used in the invention.

FIG. 5 is a sample gray list used in the invention.

FIG. 8 is a sample white list used in the invention.

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
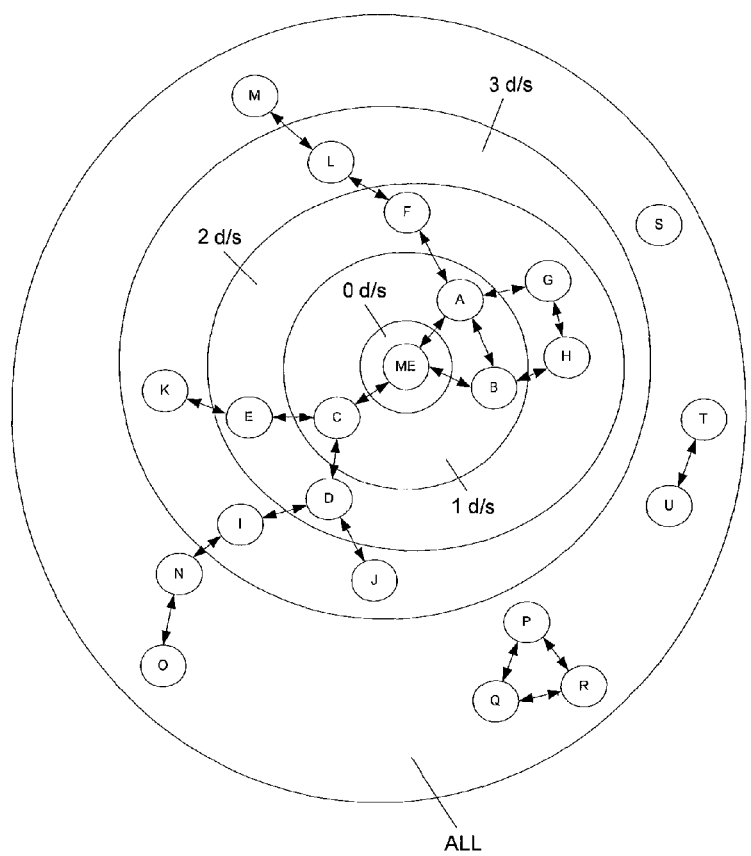
FIG. 1 is a diagram illustrating the relationships between members in a social network.

FIG. 1 illustrates a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
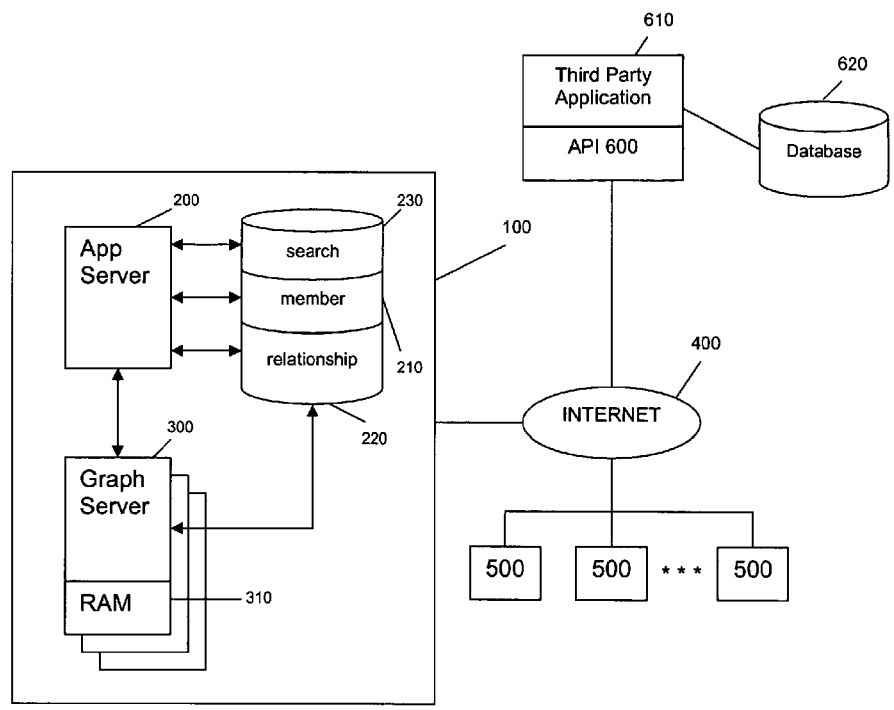
FIG. 2 is a block diagram illustrating a system for providing relationship information from a social network to an existing database.

FIG. 2 is a block diagram illustrating a system for creating and managing an online social network. As shown, FIG. 2 illustrates a system 100, including an application server 200 and graph servers 300. The computers of system 100 are connected by a network 400, e.g., the Internet, and accessible by over the network by a plurality of computers, collectively designated as 500. The application server 200 manages a member database 210, a relationship database 220, and a search database 230.

The member database 210 contains profile information for each of the members in the online social network managed by the system 100. The profile information may include, among other things: a unique member identifier, name, age, gender, location, hometown, references to image files, listing of interests, attributes, and the like. The profile information also includes VISIBILITY and CONTACTABILITY settings, the uses of which are described in a commonly owned application, "System and Method for Managing Information Flow Between Members of an Online Social Network," (U.S. patent application Ser. No. 10/854,057), issued as U.S. Pat. No. 8,010,458, filed May 26, 2004, the contents of which are hereby incorporated by reference. The relationship database 220 stores information defining to the first degree relationships between members. The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The application server 200 also manages the information exchange requests that it receives from the remote computers 500. The graph servers 300 receive a query from the application server 200, process the query and return the query results to the application server 200. The graph servers 300 manage a representation of the social network for all the members in the member database 210. The graph servers 300 and related components are described in detail in a commonly owned application, "System and Method for Managing an Online Social Network," (U.S. patent application Ser. No. 10/854, 054, issued as U.S. Pat. No. 8,572,221), filed May 26, 2004, the contents of which are hereby incorporated by reference.

Graph servers 300 store a graph representation of the social network defined by all of the members (nodes) and their corresponding relationships (edges). The graph servers 300 respond to requests from application server 200 to identify relationships and the degree of separation between members of the online social network. The application server 200 is further configured to process requests from a third party application 610 to provide social network information (e.g., the relationships between individuals) for user records maintained in a third party database 620. The third-party application 610 makes the requests to the application server 200 through an application programming interface (API) 600. The methods by which the social network information maintained in the system 100 is shared with a third party is described in detail in a commonly owned application, "Method of Sharing Social Network Information with Existing User Databases," (U.S. patent application Ser. No. 10/867,610, issued as U.S. Pat. No. 7,478,078), filed Jun. 14, 2004, the contents of which are hereby incorporated by reference.

Figure 3:
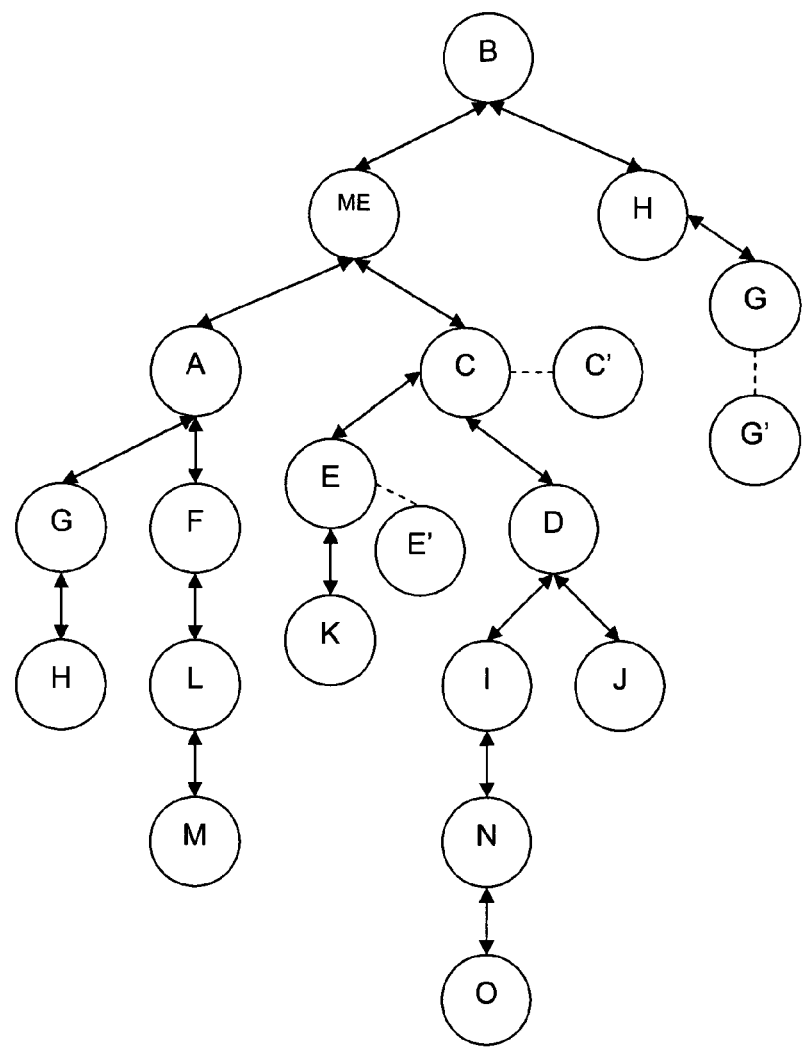
FIG. 3 is a representation of the social network of FIG. 1 in a tree format.

FIG. 3 is a representation of the social network of FIG. 1 in a tree format starting with member B at the top and showing all members connected to B. Members P-U are not shown in FIG. 3 because they are not connected to B in the social network of FIG. 1. G and H are shown twice because each is connected to B through two different paths. C', E' and G' each collectively represents individuals who are identified in contact lists maintained by members C, E and G, respectively. These individuals typically are not members of the social network of FIG. 1. Other members also maintain contact lists, but for simplicity, it is assumed that only C, E and G have data stored in their contact lists. The contact list information includes name, address, telephone numbers, e-mail addresses, and similar types of information that are stored in contact management software such as Outlook® and ACT!®.

The present invention will be illustrated with the following four examples: (1) authorizing an individual to communicate with a member of the social network (by way of e-mail, instant messaging, text messaging, voicemail, and other similar means); (2) authorizing content made available by an individual to be transmitted to a member of the social network for viewing; (3) authenticating a member of the social network for access to online content; and (4) authenticating a member of the social network for access to a loan. In each of these examples, the decision on whether to authorize the information flow to B (examples 1 and 2), or to authenticate B for access to information or service (examples 3 and 4), will be based on a black list and B's social network.

A black list used in authorizing information flow to a member (examples 1 and 2), or in authenticating the member for access to a loan (example 4) is defined with respect to the member. In the example given here, a single black list is maintained for a member. However, the black list may be defined separately for different types of activity. For example, the black list used in authorizing e-mail communication to B may be different from the black list used in authorizing content made available by an individual to be transmitted to B for viewing.

Figures 4, 5:
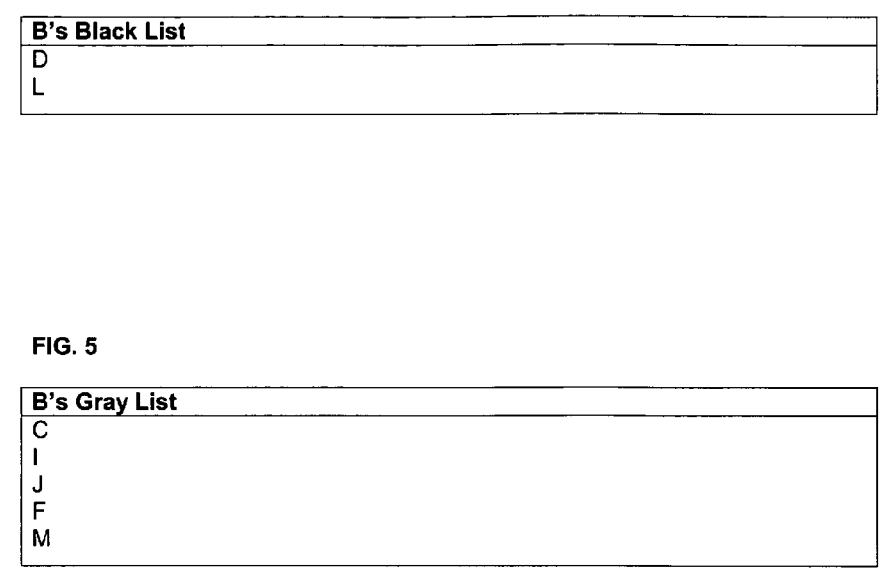

A black list that is defined with respect to a member is typically updated by that member. For example, if B received an unwanted communication (e.g., SPAM) from D and L, or while browsing profiles of other members in the social network, came across D's content and L's content that B found to be offensive, B will add D and L to its black list. This black list is shown in FIG. 4.

A black list used in authenticating a member for access to online content or service (example 3) is defined globally with respect to everyone seeking access, but it is maintained separately for each different online content/service provider. For example, a black list used in authenticating a member for access to information or service made available by a provider ABC is different from a black list used in authenticating a member for access to information or service made available by provider XYZ. This type of black list is typically updated by the provider of the information or service. For example, if the black list shown in FIG. 4 is ABC's black list, this would signify that ABC had previously determined that D and L abused their online access provided by ABC and added D and L to its black list.

A gray list is derived from a black list and the social network of the member with respect to whom authorization and authentication is being carried out. In examples 1, 2 and 4, the gray list is derived from the black list of member B and B's social network. In example 3, the gray list is derived from the black list of the provider of content or service to which member B is seeking access and B's social network. The gray list simply includes all members of B's social network who are one degree separated from any member of B's social network who is on the black list. The gray list derived from the black list of FIG. 4 and the social network of FIG. 1 would include C, I, J, F, and M, and is shown in FIG. 5.

Alternatively, the gray list may be limited to all members of B's social network who are: (i) one degree separated from any member of B's social network who is on the black list, and (ii) included in a path between the black list member and the member with respect to whom authorization and authentication is being carried out. The gray list derived in this manner would include members C and F, but not members I, J and M.

Individuals identified in the gray list of a member become non-traversing nodes with respect to that member. A "non-traversing node" with respect to a member is a node through which a connection to the member cannot be made. For example, referring to FIG. 3 and using the gray list of FIG. 5, a connection from B to E cannot be made because the path from B to E traverses through C, who is on the gray list and is a non-traversing node. The connection from B to C, on the other hand, can be made because the path from B to C ends at C and does not traverse "through" C.

Figure 6:
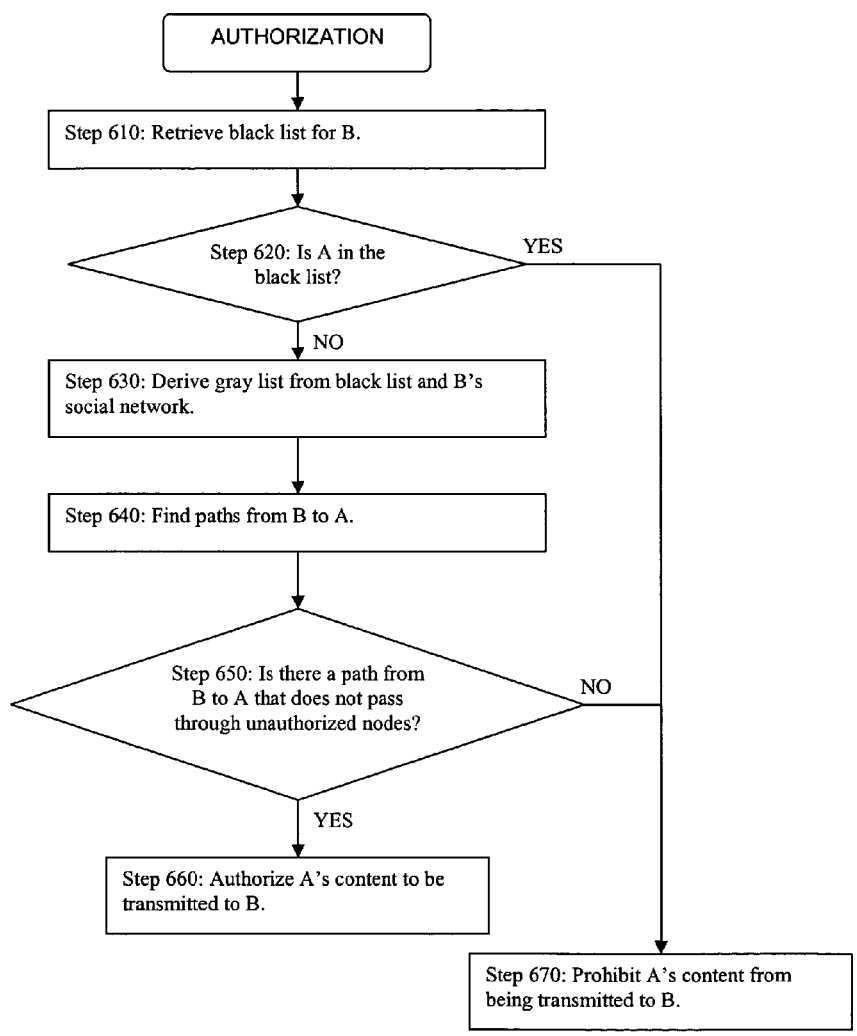
FIG. 6 is a flow diagram that illustrates the steps carried out in authorizing transmission of content to an individual.

FIG. 6 is a flow diagram that illustrates the steps carried out in authorizing an e-mail communication from A to B or authorizing transmission of A's content to B (e.g., in connection with delivery of search results in response to a search query by B). In Step 610, a black list that is maintained for B and used in authorizing e-mail communication with B is retrieved. In Step 620, the black list is searched for A. If A is identified in the black list, the information flow to B is prohibited (Step 670). Otherwise, a gray list is derived from the black list and B's social network (Step 630). In Step 640, a breadth first search (or alternatively, a depth first search) is conducted on B's social network to find paths from B to A. Optionally, the breadth first search could be limited to members who are within a maximum degree of separation value specified by the member (signifying that the member does not wish to receive communication from, or review content posted by, other members who are too far removed) or by the operator of the social network (as a way to conserve computing resources). If there is any path from B to A that does not pass through a non-traversing node (i.e., an individual in the gray list), the information flow to B is authorized (Step 660). Otherwise, the information flow to B is prohibited (Step 670).

In the example given above, the party that is providing the e-mail communication service and the search engine service and carrying out the authorizations is the operator of B's social network. The invention is applicable to situations where the party that is providing the e-mail communication service and the search engine service and carrying out the authorizations is a third party that has access to the database containing B's black list and information about B's social network. In such a case, the third party will retrieve B's black list and a graph representation of B's social network from this database in accordance with the methods described in the application, "Method of Sharing Social Network Information with Existing User Databases," (U.S. patent application Ser. No. 10/854,610, issued as U.S. Pat. No. 8,478,078), filed Jun. 14, 2004. The third party carries out the remaining steps described above (Steps 620-670) in the same manner.

Also, a person who is not a member of B's social network may be permitted to communicate with B, if the person is identified in a contact list of a member who is not identified in the gray list and connected to B along a path that does not pass through a non-traversing node. For example, referring to FIG. 3, G' will be able to send e-mail to B because G' is identified in the contact list of G who is not identified in the gray list and none of the nodes connecting G to B are non-traversing nodes. By contrast, C' will not be able to send e-mail to B because C is identified in the gray list; and E' will not be able to send e-mail to B because the only path from E to B is through a non-traversing node (C).

In an alternative embodiment, a white list identifying all members of B's social network who are authorized to transmit content to B may be generated, either real-time or off-line as a batch process, and searched each time content transmission to B is attempted. The white list generated in this manner includes all members of B's social network who are connected to B along a path that does not traverse through a member identified in B's gray list, and e-mail addresses stored in the contact lists of members who are identified in the white list and not in the gray list. The white list can be further narrowed by limiting it to those members who are within a maximum degree of separation from B, where the maximum degree of separation may be specified by either B or the operator of the social network.

Figure 7:
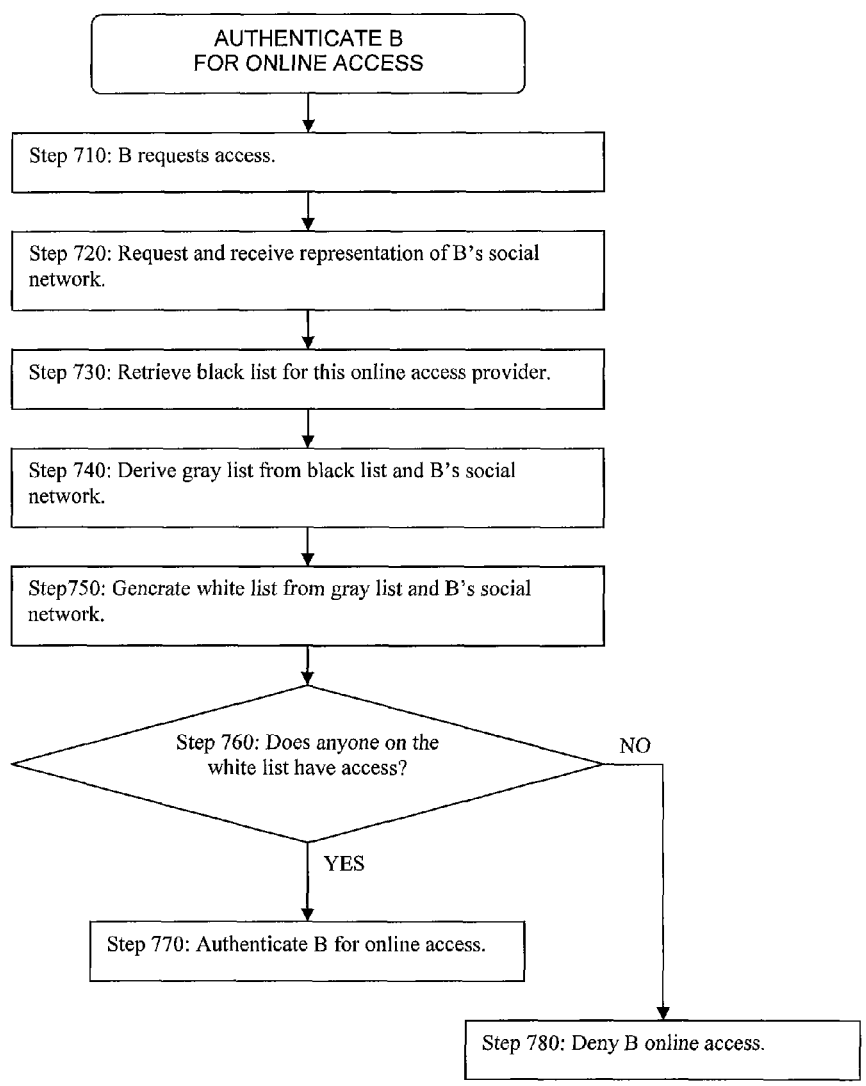
FIG. 7 is a flow diagram that illustrates the steps carried out in authenticating an individual for online access.
Figure 8:
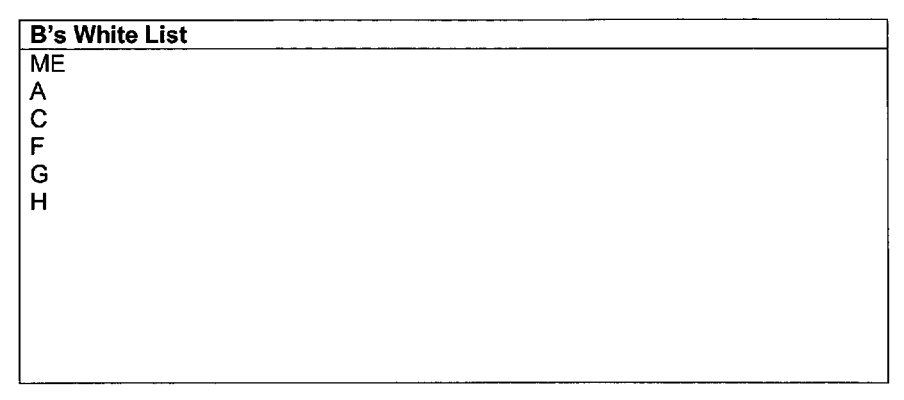

FIG. 7 is a flow diagram that illustrates the steps carried out in authenticating B for access to an online service provided by a third party. In Step 710, the service provider receives a request for access from B. The request includes certain identifying information of B, such as B's e-mail address. In Step 720, in accordance with the methods described in the application, "Method of Sharing Social Network Information with Existing User Databases," (U.S. patent application Ser. No. 10/854,610, issued as U.S Pat. No. 8,478,078), filed Jun. 14, 2004, this service provider makes a request to a social network database for a graph representation of B's social network and receives the graph representation of B's social network. In Step 730, a black list that is maintained by this service provider is retrieved. In Step 740, a gray list is derived from the black list and B's social network. In Step 750, a breadth first search (or alternatively, a depth first search) is conducted on B's social network to generate a white list. All members of B's social network who are connected to B along a path that does not traverse through any unauthorized nodes (i.e., individuals identified in the gray list) get included on this white list. FIG. 8 shows the white list generated from B's social network shown in FIG. 3 if the gray list shown in FIG. 5 corresponds to the gray list derived in Step 740. If any individual identified in the white list is in the user database of this service provider (Step 760), B's online access is authenticated (Step 770). Otherwise, B's online access is denied (Step 780).

Figure 9:
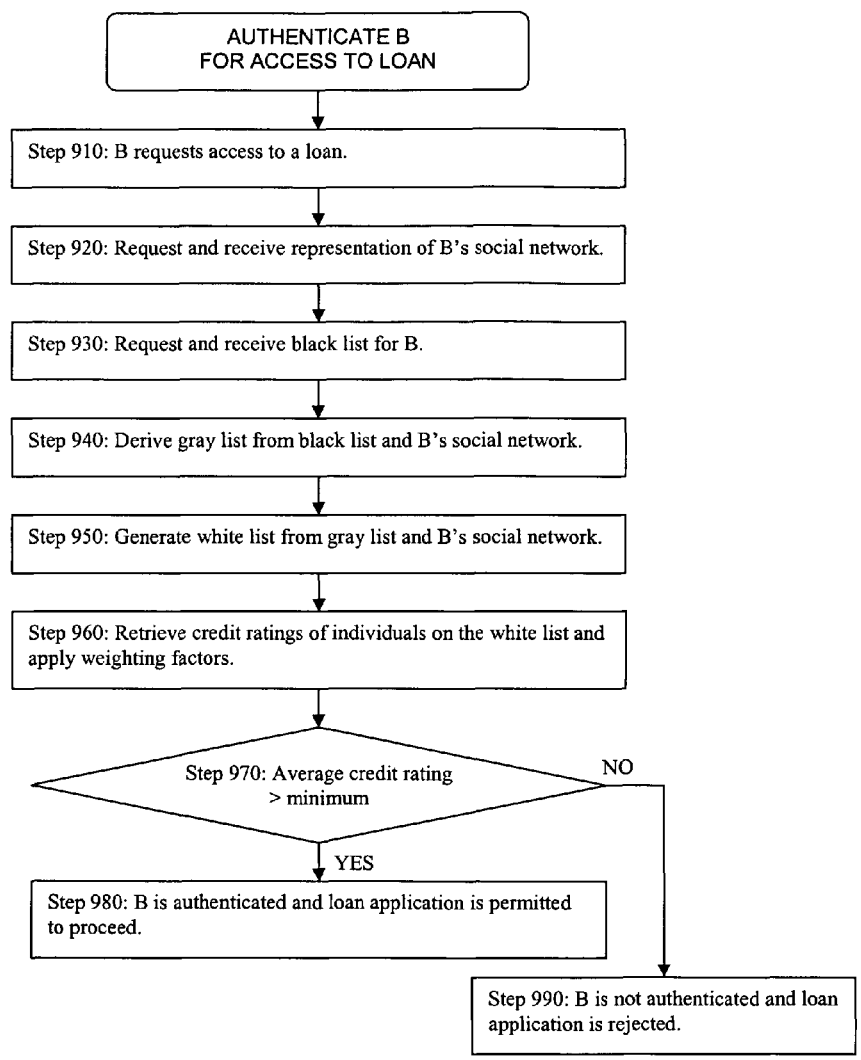
FIG. 9 is a flow diagram that illustrates the steps carried out in authenticating an individual for access to a loan.

FIG. 9 is a flow diagram that illustrates the steps carried out in authenticating B for access to a loan. In Step 910, the lender receives a request for a loan from B. The request includes certain identifying information of B, such as B's e-mail address. In Step 920, in accordance with the methods described in the application, "Method of Sharing Social Network Information with Existing User Databases," (U.S. patent application Ser. No. 10/854,610, issued as a U.S. Pat. No. 8,478,078), filed Jun. 14, 2004, this lender makes a request to a social network database for a graph representation of B's social network and receives the graph representation of B's social network. In Step 930, a black list that is maintained for B is requested and received from the social network database in the same manner as in Step 920. In Step 940, a gray list is derived from the black list and B's social network. In Step 950, a breadth first search (or alternatively, a depth first search) is conducted on B's social network to generate a white list. All members of B's social network who are connected to B along a path that does not traverse through any unauthorized nodes (i.e., individuals identified in the gray list) get included on this white list. Optionally, the lender may specify a maximum degree of separation value (e.g., $N_{max}$). If it is specified, the white list will include only those members of B's social network who are within $N_{max}$ degrees of separation from B. In Step 960, the credit ratings of individuals in the white list are retrieved and weighting factors are applied to the credit ratings based on the degree of separation between the individual and B. As an example, a weighting factor of $1/10^N$ may be applied to the credit ratings, where N is the degree of separation between the individual and B. If the average credit rating is above a minimum score, B is authenticated and the processing of B's loan application is permitted to proceed (Steps 970 and 980). If not, B is not authenticated, and B's loan application is rejected (Steps 970 and 990).

The above examples of the white list, the black list, and the gray list store member identifiers (e.g., A, B, C, etc.) to identify members of the social network. Other identifying information, such as e-mail addresses, may be stored in these lists. In cases where the lists identify persons who are outside the social network, the e-mail address is stored in place of the member identifier. For example, a SPAM e-mail address, not corresponding to any e-mail address within the social network, may be added to a member's black list. Any future attempts to send e-mail from this e-mail address will be prohibited pursuant to the decision block in Step 620 of FIG. 6. Also, if the SPAM e-mail address added to the member's black list corresponds to an e-mail address stored in a contact list maintained by a person in the social network, the gray list that is derived from this black list will include the member identifier corresponding to the person who has the blacklisted e-mail address in his or her contact list.

While particular embodiments according to the invention have been illustrated and described above, those skilled in the art understand that the invention can take a variety of forms and embodiments within the scope of the appended claims.

What is claimed is:

1. A method comprising:
    accessing, by one or more computing devices, a graph structure comprising a plurality of nodes and a plurality of edges connecting the nodes, each of the edges between two of the nodes representing a single degree of separation between them, the nodes comprising a first-user node corresponding to a first user associated with an online social network and one or more second-user nodes that each correspond to a second user associated with the online social network;
    receiving, by one or more of the computing devices, a search query from the first user;
    identifying, by one or more of the computing devices, one or more contents corresponding to the search query, each content relating to a second user; and
    generating, by one or more of the computing devices, search results comprising a reference to each identified content relating to a second user corresponding to a second-user node that is connected to the first-user node in the graph structure by a series of nodes and edges that does not comprise a node corresponding to a user on a gray list comprising user IDs of the users who are not authorized to access the identified content relating to the second user, wherein the gray list is based on a black list.

2. The method of claim 1, further comprising:
    accessing, by one or more of the computing devices, the black list comprising a first set of user IDs of a first set of users;
    wherein the gray list comprises a second set of user IDs of a second set of users, each of the nodes corresponding to the users in the second set of users being separated in the graph structure from at least one of the nodes corresponding to the users in the first set of users by only one degree of separation.

3. The method of claim 1, further comprising:
    accessing, by one or more of the computing devices, the black list comprising a first set of user IDs of a first set of users;
    wherein the gray list comprises a second set of user IDs of a second set of users, each of the nodes corresponding to the users in the second set of users being separated in the graph structure from at least one of the nodes corresponding to the users in the first set of users by a threshold degree of separation.

4. The method of claim 3, further comprising:
    filtering, by one or more of the computing devices, from the search results each reference to an identified content relating to a second user corresponding to a second-user node that is connected to the first-user node in the graph structure by a series of edges and nodes that comprises a node corresponding to a user in the first set of users or the second set of users.

5. The method of claim 4, wherein the gray list further comprises a third set of user IDs of a third set of users, the nodes corresponding to the users of the third set of users being connected in the graph structure to one or more second-user nodes corresponding to second users related to identified content by a series of edges and nodes that comprises a node corresponding to a user in the first set of users or the second set of users.

6. The method of claim 3, wherein the black list is maintained for either the first user or one of the second users.

7. The method of claim 1, wherein the gray list comprises a first set of user IDs of a first set of users, the nodes corresponding to the users of the first set of users being connected to either the first-user node or the second-user node in the graph structure through a series of edges and nodes that comprises an unauthorized node.

8. The method of claim 1, further comprising:
    transmitting, by one or more of the computing devices, the search results to the first user.

9. The method of claim 1, further comprising:
    transmitting, by one or more of the computing devices, one or more of the identified contents to the first user.

10. The method of claim 1, wherein the content relating to the second user comprises profile information of the second user.

11. The method of claim 1, wherein the content relating to the second user comprises content posted by the second user.

12. A system comprising: one or more processors; and one or more servers having a memory storing computer-executable instructions that when executed by one or more of the processors cause the processors to:
    access a graph structure comprising a plurality of nodes and a plurality of edges connecting the nodes, each of the edges between two of the nodes representing a single degree of separation between them, the nodes comprising a first-user node corresponding to a first user associated with an online social network and one or more second-user nodes that each correspond to a second user associated with the online social network;

receive a search query from the first user;

identify one or more contents corresponding to the search query, each content relating to a second user; and generate search results comprising a reference to each identified content relating to a second user corresponding to a second-user node that is connected to the first-user node in the graph structure by a series of nodes and edges that does not comprise a node corresponding to a user on a gray list comprising user IDs of the users who are not authorized to access the identified content relating to the second user, wherein the gray list is based on a black list.

13. The system of claim 12, wherein the processors are further operable when executing the instructions to:

access the black list comprising a first set of user IDs of a first set of users;

wherein the gray list comprises a second set of user IDs of a second set of users, each of the nodes corresponding to the users in the second set of users being separated in the graph structure from at least one of the nodes corresponding to the users in the first set of users by only one degree of separation.

14. The system of claim 12, wherein the processors are further operable when executing the instructions to:

access the black list comprising a first set of user IDs of a first set of users;

wherein the gray list comprises a second set of user IDs of a second set of users, each of the nodes corresponding to the users in the second set of users being separated in the graph structure from at least one of the nodes corresponding to the users in the first set of users by a threshold degree of separation.

15. The system of claim 14, wherein the processors are further operable when executing the instructions to:

filter from the search results each reference to an identified content relating to a second user corresponding to a second-user node that is connected to the first-user node in the graph structure by a series of edges and nodes that comprises a node corresponding to a user in the first set of users or the second set of users.

16. The system of claim 14, wherein the gray list further comprises a third set of user IDs of a third set of users, the nodes corresponding to the users of the third set of users being connected in the graph structure to one or more second-user nodes corresponding to second users related to identified content by a series of edges and nodes that comprises a node corresponding to a user in the first set of users or the second set of users.

17. The system of claim 14, wherein the black list is maintained for either the first user or one of the second users.

18. The system of claim 12, wherein the gray list comprises a first set of user IDs of a first set of users, the nodes corresponding to the users of the first set of users being connected to either the first-user node or the second-user node in the graph structure through a series of edges and nodes that comprises an unauthorized node.

19. The system of claim 12, wherein the processors are further operable when executing the instructions to:

transmit the search results to the first user.

20. The system of claim 12, wherein the processors are further operable when executing the instructions to:

transmit one or more of the identified contents to the first user.

* * * * *